United States Patent Office 3,843,453
Patented Oct. 22, 1974

3,843,453
PROCESS AND COMPOSITION FOR USE IN MICROBIOLOGICAL QUALITY ASSURANCE
Ronald Freake, Elkhart, Ind., assignor to Miles Laboratories, Inc., Elkhart, Ind.
No Drawing. Continuation-in-part of abandoned application Ser. No. 93,482, Nov. 27, 1970. This application Mar. 2, 1973, Ser. No. 337,407
Int. Cl. C12k 1/04
U.S. Cl. 195—103.5 R
8 Claims

ABSTRACT OF THE DISCLOSURE

Composition and process for assuring the quality and consistency of a microbiological test system or a growth supporting medium which comprises contacting said system or medium with a composition comprising, in combination, a predetermined concentration of one or more specific colony producing microorganisms, a microbiological nutrient material in an amount sufficient to preserve the viability of the microorganisms while insufficient to promote the formation of observable colonies, and a microbiologically inert colloidal suspending agent, incubating the medium and composition under predetermined controlled conditions, observing the number of microbiological colonies thus produced and comparing same to the expected count. The concepts disclosed herein also find use in the storage, delivery and utilization of microorganisms generally.

CROSS REFERENCE TO RELATED APPLICATIONS

This is a continuation-in-part of application Ser. No. 93,482 filed Nov. 27, 1970, now abandoned.

BACKGROUND OF THE INVENTION

Microbiology, although the oldest branch of laboratory medicine, is still lacking quality assurance. For example, culture media, the substance used to provide nutrients for the laboratory growth and multiplication of microorganisms, varies widely in both composition and performance. As far as existing quality assurance procedures are concerned, most laboratories rely on "known" and "unknown" stock bacterial cultures whic provide only a check on the accuracy of identification, rather than a check on the ability of the culture media or other test system or reagent to isolate the microorganism. The use of such stock cultures does not, however, provide a sensitive index to minor variations in media formulations and/or preparation, largely due to the variation in inoculum size which differs greatly from one microbiologist to another and from one transfer means to another.

DESCRIPTION OF THE PRIOR ART

In the field of laboratory microbiology, quality assurance using standardized microorganism inoculum is practically nonexistent, and no direct prior art is known. Related prior art is found in the area of reconstitutable microbiological cultures which employ gels and the like. The instance of such art is found in U.S. Pat. 3,360,440 which provides a reconstitutable hydrogel bacteriological medium homogeneously inoculated with specific quantities and forms of microorganisms for later rehydration to produce a culture medium with desired rigidity. Thus, the object is to provide a hydrogel medium which will support the growth of the specific quantities of microorganism upon rehydration. For this purpose, nutrients are included in the composition and must necessarily be in amounts sufficient to promote growth of the microorganisms upon rehydration. Such a hydrogel medium finds no use in determining the quality of microbiological growth supporting medium based on colony formation since colony formation is insured upon rehydration due to the presence of sufficient nutrients to provide a culture medium (i.e. growth or colony formation). Moreover, fixed quantities of microorganisms cannot be delivered using this system since rehydration produces instantaneous reproduction of the microorganisms. Thus, upon rehydration there is no way of knowing the exact number of microorganisms present.

SUMMARY OF THE INVENTION

The present invention consists essentially of a composition comprising a predetermined quantity of at least one variety of colony producing microorganism, a microbiological nutrient material in an amount sufficient to preserve the viability of the microorganism while insufficient to promote the formation of observable colonies, and a microorganism suspending quantity of a microbiologically inert colloidal suspending agent wherein the predetermined quantity of the microorganism is at least the minimum inoculum required to produce observable colony formation under predetermined conditions of incubation. The composition is preferably in a dried state, such as a lyophilized state, wherein it preferably includes a substance capable of retaining a sufficient amount of moisture in the composition to preserve the viability of the microorganism. The disclosed process comprises contacting the medium whose quality is to be determined with the composition disclosed herein, incubating the medium and composition under predetermined conditions and observing the number of colonies produced.

DESCRIPTION OF THE PREFERRED EMBODIMENTS

The basic procedure or process of the present invention comprises contacting or inoculating the reagent, growth medium, agar gel, test plate, solution, and so forth with a standardized microorganism composition. This composition comprises basically a standardized subculture of a known strain of microorganism which has been stabilized with a colloidal suspending agent. This composition is then used to inoculate the microbiological medium and after a controlled incubation period the actual colony count is compared to the expected count.

The initial step in preparing the composition of the present invention is to make a series of subcultures of the selected microorganism from a stock culture in order to adapt the microorganism to the stabilized culture medium and to establish growth conditions in the medium for the particular microorganism involved. In each of the subculturing steps, an accurately measured volume or aliquot of the previous culture is used to inoculate the next medium. This aliquot is taken during the so-called log phase when the microorganism is exhibiting its maximum viability and growth. When growth conditions are established and it has been determined that the strain being used is not a mutant variety, then a measured volume of the working culture is transferred to a measured volume of suspending medium and, using a precision micro delivery apparatus, a micro-aliquot of the composition is transferred to either a storage and delivery package or the medium being tested. The mode of presentation of the micro-aliquot of the composition will be more fully described hereinafter.

The present invention is applicable to any of the wide variety of known microorganisms. For example, one may select *Staphylococcus aureus, Streptococcus pyogenes, Streptococcus faecalis, Diplococcus pneumoniae, Haemophilus influenzae, Klebsiella pneumoniae, Escherichia coli, Proteus mirabilis, Salmonella* sp., "O" strain *coli*, yeast, fungi and the like.

A microbiological nutrient material is also included in the composition. It has been found that a small amount of nutrient material must be present in order to preserve the viability of the microorganism upon prolonged storage. Where the composition is in a dried state, such as a lyophilized state as is preferred, the presence of a small amount of nutrient material preserves viability for well over one year. There should not be sufficient nutrient material present to promote observable growth or colony formation during storage or upon rehydration. This is necessary in the application of the composition as a quality control means since growth is desired only where the medium being tested is capable of sustaining growth. Where fixed numbers of microorganisms are to be manipulated, the amount of nutrient material is such that the exact number of viable microorganisms in the composition is known at the time of use. Therefore, the present invention requires an amount of nutrient material which is sufficient to preserve the viability of the microorganisms while insufficient to promote microbiological growth (i.e. the formation of colonies). Nutrient material includes one or more compounds capable of supporting microbiological viability and includes generally those compounds which are nitrogen sources and particularly proteins such as the peptones, foetal calf serum, soybean protein, mixtures thereof and so forth.

As the suspending agent, it has been found that any of the microbiologically inert colloidal materials may be used. As used herein the term microbiologically inert means that the agent in no way exerts a deleterious effect on the microorganism being used. In order to facilitate the accurate delivery of the composition, it is also preferable that the agent be of the character, and used in a concentration, so that it does not form a gel. Among the inert colloidal agents found useful in the present invention are the acid polysaccharides having esterified or free carboxyl groups such as the pectins, pectic araban and galactan and seaweed polysaccharides such as the carrageenins and the alginates. Other classes of inert colloidal agents useful in the present invention comprise gelatin and similar protein degradation products, natural gums, the cellulose gums such as methylcellulose and colloidal silica.

The concentration of suspending agent depends on the particular gel forming or thickening qualities of the agent selected. In general, however, sufficient suspending agent is used so that when the microorganism is in the form of an aqueous suspension, from about 0.1% to 1.0% by weight of suspending agent is present in the aqueous suspension.

It has been found that the water soluble alginates are particularly advantageous suspending agent for use in the present invention. These substances are naturally occurring carbohydrates found in members of the Kelp family. The sodium salt, called algin, is the most important derivative of alginic acid found useful in the present invention. It has been found that about from 0.1% to 0.5% by weight of sodium alginate is advantageously used as a suspending agent in the present invention. Not only does this act as a colloidal suspending agent for the standard suspension of microorganisms but also has the important role of minimizing crystal formation during the freeze drying procedure.

Where the composition is in a dried state it preferably includes a substance capable of retaining a sufficient amount of moisture in the composition to preserve the viability of the microorganism. Such a substance prevents loss of moisture essential to viability during the drying process and in the dried state. Such substances which are useful therefor include various carbohydrates such as the polysaccharides, glucose and sucrose. Glucose is particularly useful in this regard.

As previously indicated, the composition of the present invention may be used in any of several different ways. For example, the final micro-aliquot of the microorganism culture may simply be placed in a sterile vial, freeze dried and capped. Another mode of presentation or use comprises adding the micro-aliquot to a carrier such as a paper disc or membrane. Another mode of use comprises the direct addition of a stabilized liquid suspension of the microorganism to the medium being tested by means of a micropipette.

In quality control use, it is contemplated that a series of compositions of the present invention be used to test a batch of media, agar gel, and so forth, and that the minimum number of organisms necessary to initiate growth be established. This procedure and the resultant figure obtained is termed the "isolating coefficient" for the particular system or medium being checked. For example, a new batch of medium may be prepared and tested with a series of compositions of the present invention varying between 5 and 100 colonies per standard. Under standard growth conditions, the medium will initiate microorganism growth only when a sufficient number of such microorganisms are present in the composition. Thus, the isolating coefficient of the medium will be the quantity of microorganisms in the composition with the lowest number of microorganism which first shows colony growth under the standardized conditions. This quantity may also be described as the "maintain inoculum."

As a self check on the viability of the microorganism, each batch of compositions of the present invention may have a standard nutrient pad which when contacted with the composition will support growth thereof and indicate to the user that the microorganisms contained in the composition are still in a viable condition.

It is contemplated that the processes and compositions of the present invention have utility and apply to areas other than quality control or assurance, particularly where small numbers or countable amounts of microorganisms are involved. For example, the stabilized microorganism, prepared as disclosed herein, provides a unique and facile way of delivering a fixed quantity (i.e. known exact quantity) of microorganism to a laboratory or production facility. One may thus use the compositions of the present invention to introduce the required microoganisms to an assay system for folic acid or Vitamin B–12 which have traditionally been analyzed by a microbiological technique.

The following examples are merely illustrative of the present invention and are not intended to limit the scope thereof.

EXAMPLE 1

A subculture of *Escherichia coli* was prepared by inoculating a stabilized culture medium having the following composition:

| | Gm. |
|---|---|
| Peptone | 0.5 |
| Sodium alginate | 0.5 |

Sterile, distilled water to make 100.0 ml.

The subculture was incubated overnight at 37° C.

The next morning, 10 ml. of the subculture was thoroughly mixed for 2 minutes, using a vortex mixing device, and after a 3 minute wait to allow the air bubbles to disperse, a second tube of the above culture medium was inoculated with 0.01 ml. of the first subculture. The secon subculture was incubated for 8 hours at 37° C. A third subculture was made in the manner described above and allowed to incubate overnight at 37° C.

Using the third subculture, a working culture was prepared by again adding 0.01 ml. thereof to 10.0 ml. of the stabilized culture medium and incubating for exactly 8 hours at 37° C. A dilute, stabilized bacterial suspension was then prepared by transferring 0.01 ml. of the working culture to 15.0 ml. of a suspending/lyophilizing medium having the following composition:

| | Gm. |
|---|---|
| Peptone | 0.5 |
| Sodium alginate | 0.5 |
| Glucose | 7.5 |

Sterile, distilled water to make 100.0 ml.

Using a precision micro delivery apparatus (B. Braun—Unita I—Type No. 87010—Continuous Infusion Apparatus—Catalog No. 71012), 0.01 ml. of dilute bacterial suspension was added to a 5 ml. vial. The suspension was then freeze dried and the vial sealed under vacuum. The freeze dried aliquot was then reconstituted to the original volume and transferred to an agar plate and found to produce 30 colonies of *E. coli*.

Additional samples of the dilute bacterial suspension were added to individual vials and freeze dried as indicated above. When plated out, the colony count was found to vary from about 27 to 35 colonies per vial.

EXAMPLE 2

Example 1 was repeated except that *Staphylococcus aureus* was used in place of the *E. coli*. Reproducibility similar to that described in Example 1 was obtained.

EXAMPLE 3

Example 1 was repeated except that *M. lysodeikticus* was used in place of the *E. coli*. Reproducibility similar to that described in Example 1 was obtained.

EXAMPLE 4

Example 1 was repeated except that the volume of suspending/lyophilizing medium was increased to 200 ml. The colony count obtained varied from 13 to 16.

EXAMPLES 5–7

Example 1 was repeated except that the following suspending agents were used in the culture media:

| Example | Agent | Concentration (percent by weight) |
|---|---|---|
| 5 | Gelatin | 0.1 |
| 6 | Foetal calf serum | 1.0 |
| 7 | Colloidal silica | 0.1 |

What is claimed is:

1. A process for determining the consistency and quality of microbiological growth supporting media, which comprises contacting said medium with a composition comprising a predetermined quantity of a microorganism capable of producing colonies in or on said medium, said predetermined quantity being at least the minimum inoculum required to produce observable colony formation under predetermined conditions of incubation, and a microbiologically inert colloidal suspending agent, incubating said medium and said composition under predetermined conditions and observing the number of microbiological colonies thus produced.

2. A process as in claim 1 wherein the colloidal suspending agent is selected from the group consisting of water soluble alginates, gelatin, natural gums, colloidal silica, cellulose gums, acid polysaccharides and seaweed polysaccharides.

3. A process as in claim 1, wherein said composition additionally comprises a microbiological nutrient material in an amount sufficient to preserve the viability of said microorganism while insufficient to promote the formation of observable colonies.

4. A process as in claim 3, wherein said composition is in a dried state.

5. A process as in claim 4, wherein said composition additionally comprises a substance capable of retaining a sufficient amount of moisture in said composition to preserve the viability of said microorganism.

6. A process as in claim 5, wherein said substance capable of retaining a sufficient amount of moisture in said composition comprises glucose.

7. A process as in claim 1, wherein said composition comprises an aqueous suspension of said microorganism in about from 0.1% to 1.0% by weight of colloidal suspending agent.

8. A process as in claim 1, wherein said composition comprises the dried solids remaining from an aqueous suspension of said microorganism in about from 0.1% to 1.0% by weight of colloidal suspending agent.

References Cited

UNITED STATES PATENTS 3,360,440   12/1967   Haab et al. _____ 195—103.5 R

A. LOUIS MONACELL, Primary Examiner

R. J. WARDEN, Assistant Examiner

U.S. Cl. X.R.

195—100

UNITED STATES PATENT OFFICE
CERTIFICATE OF CORRECTION

Patent No. 3,843,453               Dated October 22, 1974

Inventor(s) Ronald Freake

It is certified that error appears in the above-identified patent and that said Letters Patent are hereby corrected as shown below:

In Column 1, Line 43 "whic" should be --which--. In Column 4, Line 21 "microorganism" should be --microorganisms--. In Column 4, Line 23 "maintain" should be --minimum--. In Column 4, Line 61 "on" should be --ond--. In Column 5, Line 3 "0.01" should be --0.02--.

Signed and sealed this 1st day of April 1975.

(SEAL)
Attest:

RUTH C. MASON
Attesting Officer

C. MARSHALL DANN
Commissioner of Patents
and Trademarks